United States Patent [19]
White

[11] Patent Number: 4,603,821
[45] Date of Patent: Aug. 5, 1986

[54] SYSTEM FOR MOUNTING A JET ENGINE

[75] Inventor: John L. White, Bellevue, Wash.

[73] Assignee: The Boeing Company, Seattle, Wash.

[21] Appl. No.: 567,221

[22] Filed: Dec. 30, 1983

[51] Int. Cl.4 .............................................. B64D 27/18
[52] U.S. Cl. ..................... 244/54; 248/554; 60/39.31
[58] Field of Search .............. 244/53 R, 54; 60/39.31, 60/226.1; 248/554–557

[56] References Cited

U.S. PATENT DOCUMENTS

| | | | |
|---|---|---|---|
| 1,723,763 | 8/1929 | Burnelli . | |
| 2,355,370 | 8/1944 | Frey | 248/5 |
| 2,539,960 | 1/1951 | Marchant et al. | 60/102 |
| 2,978,209 | 4/1961 | Kerry | 244/54 |
| 2,987,271 | 6/1961 | Heath et al. | 244/15 |
| 3,020,004 | 2/1962 | Blyth et al. | 244/54 |
| 3,327,965 | 9/1965 | Bockrath | 244/54 |
| 3,488,945 | 6/1969 | Ascani, Jr. | 244/12 |
| 3,502,287 | 3/1970 | Lindsay | 244/54 |
| 3,675,418 | 7/1972 | Lenkeit et al. | 60/39.31 |
| 3,750,983 | 9/1973 | Morris | 244/54 |
| 3,844,115 | 10/1974 | Freid | 60/39.31 |
| 4,013,246 | 3/1977 | Nightingale | 244/54 |
| 4,022,018 | 5/1977 | Tuten et al. | 60/200 |
| 4,044,973 | 8/1977 | Moorehead | 244/54 |
| 4,361,296 | 11/1982 | Hall et al. | 244/54 |

FOREIGN PATENT DOCUMENTS

| | | | |
|---|---|---|---|
| 258595 | 11/1927 | Fed. Rep. of Germany . | |
| 459270 | 9/1950 | Italy . | |
| 762785 | 12/1956 | United Kingdom | 244/54 |

Primary Examiner—Galen L. Barefoot
Attorney, Agent, or Firm—Christensen, O'Connor, Johnson & Kindness

[57] ABSTRACT

Fan casing (32) of turbo fan jet propulsion engine (20) is mounted to a forward portion of a wing strut (24) by a forward hanger assembly (50). The rearward portion of the core assembly (26) of engine (20) is suspended from wing strut (24) by a rearward hanger assembly (80). A yoke assembly (100) extends forwardly from rear hanger assembly (80) to interconnect with the forward portion of the engine core assembly (26) to restrain against axial movement thereof. Fan casing link (66) extends diagonally upwardly and rearwardly from fan casing (32) to intersect with wing strut (24) at a location rearwardly from the location at which the forward hanger assembly (50) is secured to the wing strut. The fan casing link (66) functions to restrain fan casing (42) from axial movement relative to engine core assembly (26) thereby reducing the relative displacement between these sections of engine (20) due to reactive thrust loads acting through the engine (20) and air loads acting upwardly against a leading inlet cowling (40) that extends forwardly of fan casing (32).

10 Claims, 16 Drawing Figures

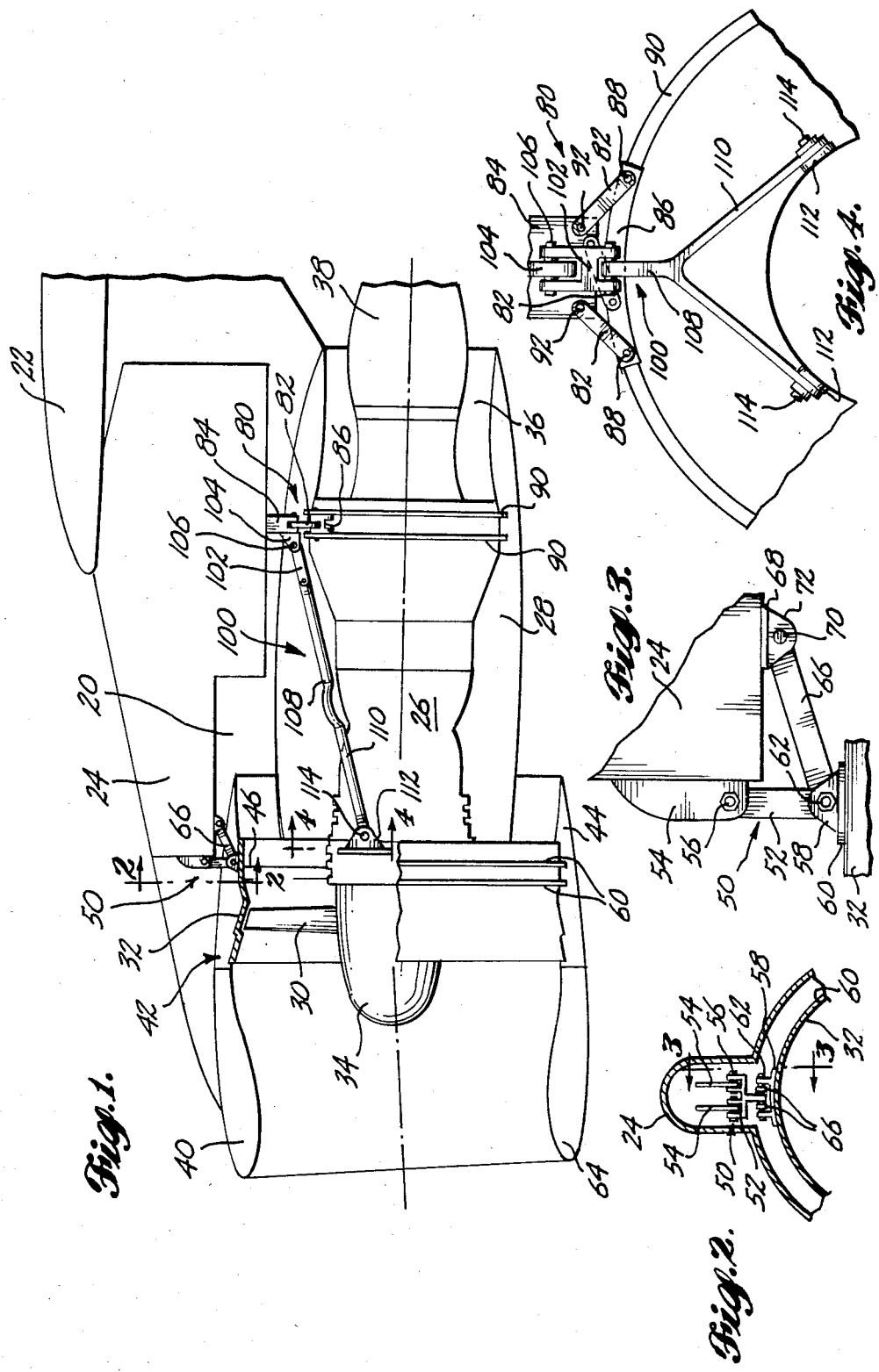

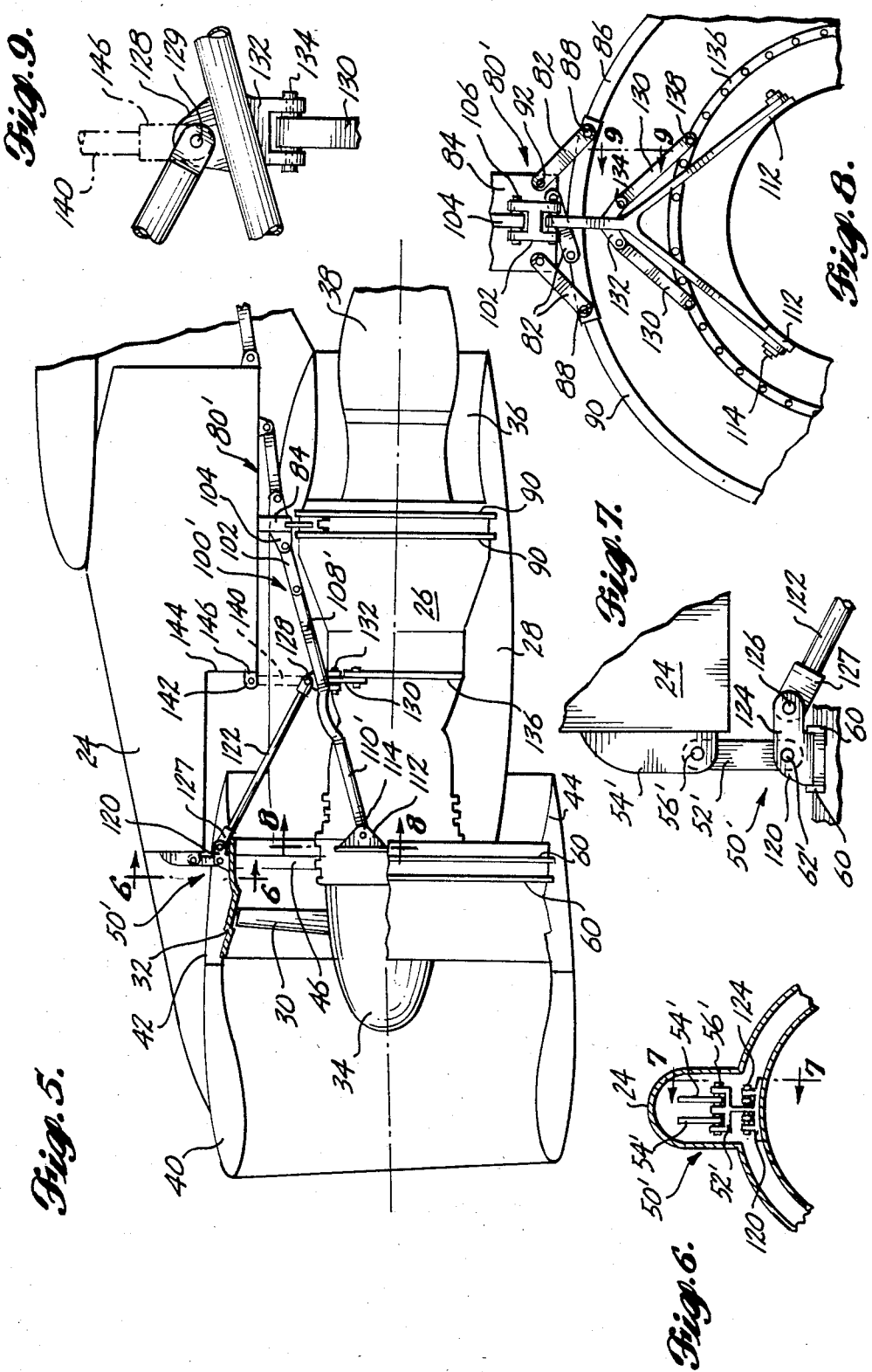

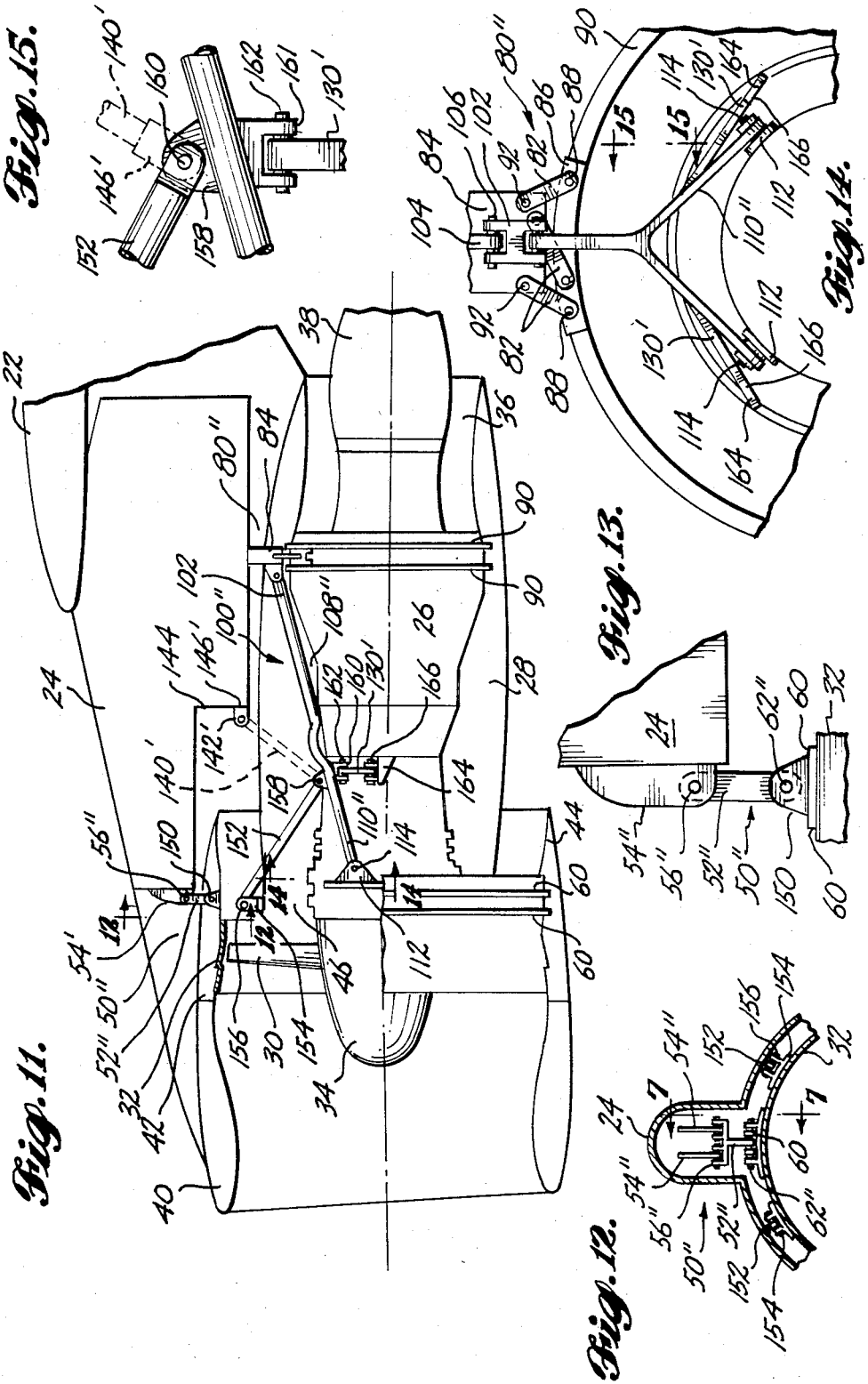

SYSTEM FOR MOUNTING A JET ENGINE

TECHNICAL FIELD

The present invention relates to a system for mounting a jet propulsion engine on a second body, and more particularly, to a system for mounting a jet engine on an aircraft to prevent relative movement between the engine rotor blade tips and the engine casing enclosing the blades.

BACKGROUND OF THE INVENTION

Turbo fan jet propulsion jet engines for aircraft typically include compressor blades mounted on the forward end of engine rotors that rotate within a close fitting casing. The casing usually is secured to an overhead portion of the aircraft by a front mount assembly that depends downwardly from the aircraft to interconnect with the upper portion of the casing. Also, typically, a rear mount is employed that depends downwardly from the aircraft to interconnect a rearward section of the engine core. Spoke type struts extend radially outwardly from the engine forward core case to interconnect with the inside diameter of the fan casing.

The advent of large, high bypass turbo-fan jet propulsion engines has resulted in relative deflection between the engine casings and the rotors of engines that have been mounted to the aircraft by conventional means, thereby resulting in rubbing contact between the rotor blade tips and the engine casings. When the engines are operated at full power, such as during takeoff, the high thrust loads that act through the engine must be reacted by the engine thrust mounts. Since the engine thrust mounts are generally offset from the longitudinal center of the engine, bending moments are generated in the engine cases. The large bending loads resulting therefrom cause deflection of the engine components resulting in interference between the rotor blades and their associated casings.

In addition, when the aircraft is disposed at a high angle of attack, such as during takeoff, the air flowing around and through the inlet cowl pushes upwardly resulting in a bending moment being transferred from the cowling to the rearwardly interconnected fan casing and inwardly through the fan struts into the core casing. This bending moment results in further deflection of the casings and adds to the interference between rotating and stationary portions of the engine.

Excessive blade and tip seal wear increases the clearance between these components causing loss of fuel efficiency. In addition, a phenomenon known as blade tip stall may result from larger clearances between the blade tips and the engine casings. This can lead to vibrational problems associated with non-synchronous whirl motion of the rotors. Moreover, when compressor blades rub against their surrounding seal, particles are removed from the blade tips and the seal. The deposition of these particles on the extremely hot turbine sections of the engine roughens the turbine blades and stators and reduces their aerodynamic efficiency.

One standard technique for eliminating tip rub has been simply to provide larger clearances between the blades and the casing or selectively pregrind the sections of the casing which are susceptible to tip rub. Although this may assist in avoiding blade and seal particles from being deposited on the hot engine sections and avoiding loss of blade tip material, it results in lower fuel efficiency and can cause detrimental vibration of the rotors.

Another straighforward approach to reducing tip rubs is to thicken the engine casings and increase the number of rotor bearings to provide stiffening and better concentricity between rotors and stationary parts (casings, seals, frames). This approach, however, is very costly in terms of weight and complexity and is impractical in light of other alternatives.

Another attempted solution to the foregoing problems has been to mount the jet engine on an aircraft to avoid transfer of inlet induced loads through the engine core assembly. In this type of arrangement, the engine core assembly and the fan casing are mounted to a structural member of the aircraft, such as a pylon, independently of each other. However, since the pylon cannot be constructed in an absolutely rigid manner, under full engine power and at high angles of attack, a significant degree of relative movement may occurr between the engine core assembly and the fan casing leading to the rubbing of the fan blades against the casing. Examples of this type of engine mounting arrangement are disclosed by U.S. Pat. Nos. 3,750,983 and 4,013,245.

In a jet engine mounted in a nacelle structure, a proposed solution to the foregoing problems has been to place a hydraulic actuator between the bottom of the fan casing and the nacelle structure in an attempt to restrain the fan casing against movement relative to the nacelle structure. An example of this type of mounting structure is disclosed by U.S. Pat. No. 4,022,018.

Accordingly, it is a principal object of the present invention to provide a system for mounting a high bypass turbo fan jet propulsion engine to an aircraft so as to reduce blade and tip seal wear thereby increasing performance during takeoff and cruise, reducing fuel consumption and reducing deposition of metal particles from the compressor blades and tip seals on the very high temperature components of the engine.

More particularly, it is an object of the present invention to mount the high bypass turbo fan jet propulsion engine on an aircraft in such a manner to minimize the bending flexure and distortion of engine components caused by thrust loads and air loads on the engine inlet cowling.

Another object of the present invention is to achieve the foregoing objects while at the same time accommodating the thermal expansion and contraction of the engine components due to changes in the temperature of the engine.

SUMMARY OF THE INVENTION

The foregoing and other objects are achieved in accordance with the present invention by utilizing a forward hanger assembly to suspend the fan casing of a turbo fan jet propulsion engine to a forward section of a wing strut depending downwardly from an aircraft wing. The forward hanger assembly includes a substantially vertical forward hanger member having its upper end portion pinned to the wing strut and its lower end portion pivotally secured to an upper portion of the fan casing. The forward hanger assembly restrains the fan casing against vertical and lateral movement relative to the wing strut.

The securing system of the present invention also includes a rear hanger assembly for suspending the rear portion of the core assembly of the jet engine to a rearward section of the wing strut. The rearward hanger assembly functions to restrain the engine core assembly against vertical, lateral and roll movement relative to the wing strut.

The securing system of the present invention further includes an elongate thrust yoke that extends forwardly from the rear hanger assembly to interconnect with the forward portion of the engine core assembly. The thrust yoke is designed and positioned to carry axial loads imposed on the engine.

The securing system of the present invention in addition includes structural links to restrain the fan casing against pitch movement relative to the engine core assembly. By restraining the fan casing in this manner, applicant has found that the relative flexing between the fan casing and the engine core assembly is substantially diminished.

In one preferred form of the present invention, the forward end portion of a structural link is secured to the fan casing at a location adjacent the location at which the forward hanger member is secured to the fan casing. From its interconnection with the fan casing, the link extends diagonally rearwardly and upwardly to intersect with the wing strut at a location rearwardly from the location that the upper end of the forward hanger member interconnects with the wing strut.

In an alternative preferred embodiment of the present invention, a structural link has its forward end portion interconnected with the fan casing at a location adjacent the location at which the forward hanger member intersects the fan casing. From this forward location, the link extends rearwardly and diagonally downwardly to interconnect with an intermediate portion of the thrust yoke thereby to transmit the axial loads imposed on the fan casing to the thrust yoke. Auxiliary links may be employed to reinforce the thrust yoke to enable it to carry the increased loads imposed thereon by the fan casing link. The auxiliary links may extend downwardly from an intermediate portion of the thrust yoke to interconnect with an intermediate portion of the engine core assembly. Additionally or alternatively, the auxiliary links may be in the form of upper links that extend upwardly from an intermediate portion of the thrust yoke to intersect with an overhead portion of the wing strut.

In a further preferred embodiment of the present invention, a pair of truss links are employed to interconnect the fan casing with the forward forked portions of the thrust yoke. The links are interconnected with the fan casing at locations circumferentially spaced from the locations at which the forward hanger member is connected to the fan casing. This form of the present invention may also employ auxiliary links for reinforcing the intermediate portion of the thrust yoke. The auxiliary links may be in the form of lower links that extend downwardly from the thrust yoke to interconnect with the underlying portion of the engine core assembly. Additionally or alternatively, the auxiliary links may be in the form of upper links that extend upwardly from a central portion of the thrust yoke to interconnect with an overhead portion of the wing strut.

BRIEF DESCRIPTION OF THE DRAWINGS

The details of typical embodiments of the present invention will be described in connection with the accompanying drawings, in which:

FIG. 1 is a longitudinal sectional view of a high bypass, turbo fan jet propulsion engine coupled to an underslung wing strut with the securing system of the present invention with portions broken away for clarity;

FIG. 2 is a fragmentary cross-sectional view of the engine and wing strut shown in FIG. 1 taken substantially along line 2—2 thereof and specifically illustrating the attachment of the engine fan casing to the wing strut;

FIG. 3 is an enlarged side elevational view of the portion of the securing system of the present invention illustrated in FIG. 2, taken substantially along line 3—3 of FIG. 2;

FIG. 4 is an enlarged, fragmentary cross-sectional view of the engine of FIG. 1 specifically illustrating a thrust yoke for transferring axial loads from the engine core assemble to the wing strut;

FIG. 5 is a longitudinal sectional view of a high bypass, turbo fan jet propulsion engine secured to an underslung wing strut by a second preferred embodiment of the securing system of the present invention with portions broken away for clarity;

FIG. 6 is a fragmentary, cross-sectional view taken substantially along section line 6—6 of FIG. 5 and specifically illustrating a portion of the present invention for securing the fan casing to the wing strut;

FIG. 7 is an enlarged side elevational view of FIG. 6 taken substantially along line 7—7 of FIG. 6;

FIG. 8 is a fragmentary cross-sectional view of the engine of FIG. 5 taken substantially along line 8—8 thereof and specifically illustrating the thrust yoke and a fan casing strut assembly; and FIG. 9 is an enlarged, fragmentary elevational view of a portion of the securing system of the present invention illustrated in FIG. 8 taken substantially along line 9—9 in FIG. 8 and specifically illustrating the interconnection between the fan casing strut and the thrust yoke;

FIG. 11 is a longitudinal sectional view of a high bypass, turbo fan jet propulsion engine coupled to an underslung wing strut with an additional preferred embodiment of the securing system of the present invention with portions broken away for clarity;

FIG. 12 is a fragmentary cross-sectional view of the present invention shown in FIG. 11 taken substantially along line 12—12 thereof and specifically illustrating the attachment of the fan casing to the wing strut;

FIG. 13 is an enlarged side elevational view of a portion of the securing system of the present invention illustrated in FIG. 12, as taken substantially along line 13—13 of FIG. 12;

FIG. 14 is a partial cross-sectional view of the engine of FIG. 11 taken substantially along line 14—14 thereof and specifically illustrating the thrust yoke and the fan casing strut assembly of the present invention;

FIG. 15 is an enlarged, fragmentary elevational view taken substantially along lines 13—13 of FIG. 12 and specifically illustrating the interconnection between the fan casing strut assembly and the thrust yoke; and, FIG. 16 is a partially schematic, fragmentary, isometric view of the thrust yoke, fan casing strut assembly and auxiliary strut assemblies of the present invention illustrated in FIG. 11.

DETAILED DESCRIPTION

Figure 10:
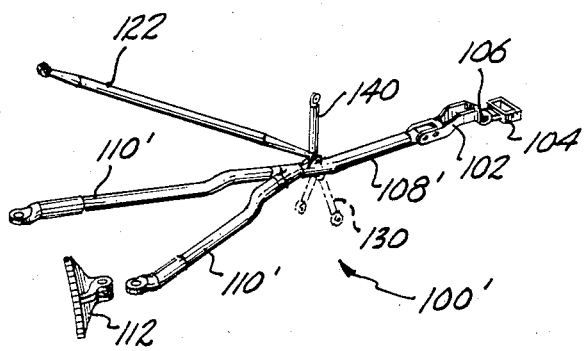
FIG. 10 is a partially schematic, fragmentary, isometric view of the thrust yoke; fan casing strut assembly and auxiliary strut assemblies illustrated in FIG. 5.

Referring initially to FIG. 1, a high bypass, turbo fan jet propulsion engine 20 is mounted beneath an aircraft wing 22 on a downwardly and forwardly extending engine mounting strut 24. The engine mounting strut 24 is affixed to the aircraft wing in a conventional manner. The high bypass turbo fan engine includes a core assembly 26 coaxially disposed within an engine casing 28. The forward portion of engine 20 includes a fan 30 powered by the core assembly, a fan casing 32 surrounding the fan and a fan spinner 34 extending forwardly of the fan casing. The rearward portion of engine 20 includes an exhaust nozzle 36 and a nozzle plug 38. The forward portion of core assembly 26 is coaxially disposed within a cowling assembly composed of a leading inlet cowling 40, an intermediate fan cowling 42 and a rearward fan nozzle 44. Fan casing 32 is rigidly disposed within fan cowling 42, and a plurality of spoke type struts 46 extend radially outwardly from the forward portion of engine core assembly 26 to interconnect with the interior circumferential portions of the fan casing thereby to position the fan casing radially relative to the engine core assembly and the fan.

The securing system of the present invention for suspending engine 20 from wing strut 24 includes a forward hanger assembly 50 that secures fan casing 32 to the forward end of wing strut 24 and a rearward hanger assembly 80 that secures a rearward portion of engine core assembly 26 to a rearward portion of the wing strut. In addition, a thrust yoke assembly 100 extends forwardly from rear hanger assembly 80 to interconnect with a forward portion of the engine core assembly.

Referring specifically to FIGS. 1-3, forward hanger assembly 50 includes a substantially vertically disposed hanger member 52 having its upper end portion constructed in the form of a double clevis to bridge across a pair of parallel, spaced apart lugs 54 mounted on the forward end of wing strut 24. The upper end of hanger member 52 is pinned to the lugs by a crosspin 56 extending through aligned openings formed in the lugs and a corresponding opening formed in the hanger member. The lower end of hanger member 52 is pinned to a bracket 58 secured to the upper portion of radial flanges 60 extending circumferentially around the outer circumference of a fan casing 32. The lower end of hanger member 52 is secured to bracket 58 by a crosspin 62 extending through aligned holes formed in a pair of upwardly extending ear portions of the bracket and through a corresponding hole in the hanger member. Hanger member 52 functions to restrain fan casing 32, and thus the forward portion of engine 20, against lateral and vertical movement relative to wing strut 24.

Still referring specifically to FIGS. 1-3, forward hanger assembly 50 also includes a structural link 66 having its forward end portion constructed in the form of a clevis and pinned to bracket 58 with crosspin 62. As shown in FIG. 2, the forward end of link 66 is disposed along opposite sides of the lower portion of hanger member 52. From bracket 58, link 66 extends diagonally rearwardly and upwardly to pivotally interconnect with a mounting bracket 68 depending downwardly from the underside of wing strut 24. Link 66 is pinned to bracket 68 by a crosspin 70 extending through aligned holes formed in the downwardly extending ear portions 72 of bracket 68. The link 66 functions to restrain fan casing 32 against pitching movement relative to wing strut 24, and thus, relative to engine core 26.

Applicant has found that the radial struts 46 extending radially outwardly from the forward portion of engine core assembly 26 to intersect the inside diameter of fan casing 32 do not fully resist relative pitch movement between the fan casing and the engine core assembly when engine 20 is subjected to bending moments (acting about forward and rear hanger assemblies 50 and 80) generated by high bending loads caused by thrust loads and by air loads acting upwardly on the forward portion of inlet cowling 40. As a consequence, as discussed above, under these loads, fan casing 32 tends to deflect relative to the engine core assembly 26 thereby causing fan blades 30 to rub against the fan casing. However, applicant has found that link 66 advantageously eliminates to a substantial degree the relative flexing between fan casing 32 and the adjacent forward portion of the engine core assembly by restraining the fan casing against pitch movement relative to the engine core assembly. Thus, the likelihood of interference between the fan blades and the fan casing is substantially reduced.

Rear hanger assembly 80, as shown in FIGS. 1 and 4, includes three hanger members 82 extending downwardly and laterally from a bracket 84 secured to the underside of wing strut 24 to interconnect with an arcuate transverse bracket 86 at pivot points 88. The transverse bracket 86 is secured to radially extending flanges 90 extending circumferentially around the rearward portion of core assembly 26. The upper ends of hanger members 82 are pinned to bracket 84 at 92. It is to be understood that hanger members 82 can be constructed in the form of solid link bars, but ideally are of tubular construction to minimize the weight of the hanger members. The rearward hanger assembly 80 is designed to resist lateral, vertical and torsional movement of engine core assembly 26 relative to wing strut 24.

Next, referring specifically to FIGS. 1 and 4, thrust yoke assembly 100 includes a rearward connector 102 having its rear end portion pivotally connected to a mounting lug 104 extending forwardly from bracket 84 of the rearward hanger assembly by a crosspin 106. The forward end of connector 102 is fixedly secured to the rearward end of yoke member 108. From connector 102, the yoke member 108 extends forwardly and downwardly as a singular member and then branches into two forks 110 at a location just above engine core assembly 26. The forward ends of forks 110 are pivotally pinned to generally triangularly-shaped mounting brackets 112 mounted on the forward portion of engine core assembly 26. Forks 110 are pivotally secured to mounting brackets 112 by crosspins 114. Ideally, yoke member 108 is formed from lightweight, high strength tubular material.

The yoke assembly functions to restrain engine core assembly 26 against longitudinal movement relative to wing strut 24. Also, by closely overlying the engine core assembly, the yoke assembly thermally expands at a rate corresponding to the expansion rate of the engine core assembly thereby to avoid imposing loads on jet engine 20 as the engine expands and contracts during temperature changes of the engine.

FIGS. 5-10 illustrate an alternative preferred embodiment of a securing system of the present invention for mounting a turbo fan jet propulsion engine to an aircraft wing. The components of wing 22, engine 20 and the securing system shown in FIGS. 5-10 that are identical or substantially identical to corresponding components shown in FIGS. 1-4 are referred to by the same reference numerals. The construction and functions of these components have been described above, and thus will not be entirely repeated here. Instead, the following description will focus on the differences between the securing system shown in FIGS. 5-10 from that shown in FIGS. 1-4.

Rearward hanger assembly 80' is ideally substantially identical to the corresponding hanger assembly 80 shown in FIGS. 1-4. However, forward hanger assembly 50' is somewhat different in construction than forward hanger assembly 50 shown in FIGS. 1-4. Forward hanger assembly 50' does include a generally vertical hanger member 52' that depends downwardly from lugs 54' to pivotally connect with a bracket 120 secured to radial flanges 60 of fan casing 32. A crosspin 56' extends transversely through aligned openings formed in the lower portion of lugs 54' and through a corresponding cross hole formed in the upper end of hanger member 52'. Also, a cross pin 62' extends transversely through aligned openings formed in the upwardly extending, parallel, spaced apart ears 124 of bracket 120 and through a cross hole formed in the lower end portion of hanger member 52'.

A singular, elongate fan casing link 122 is pivotally interconnected between rearwardly extending portions of bracket ears 124 by a crosspin 126 extending through aligned holes formed in the ears and through openings formed in a clevis 127 secured to the forward end portion of fan casing link 122. Rather than interconnecting with an adjacent portion of wing strut 24, fan casing link 122 instead extends diagonally downwardly and rearwardly to interconnect with a bracket 128 mounted on thrust yoke 108' at a location slightly rearwardly of the location at which the yoke is bifurcated into forwardly extending forks 110'. The lower, rearward end of link 122 is pinned to the upwardly extending ear portions of the bracket by a cross pin 129 extending through aligned holes formed in the ear portions and a corresponding hole formed in the link.

It will be appreciated that fan casing link 122 performs the same function as link 66 shown in FIGS. 1-4, i.e., to restrain fan casing 32 from pitch movement relative to engine core assembly 26. In addition, fan casing link 122 is capable of accommodating longitudinal growth of jet engine 20 due to the thermal expansion of the engine. This is possible since the rearward end of link 122 is secured to yoke 108' which, as discussed above, expands and contracts with the extension and contraction of engine 20. Moreover, since a portion of fan casing link 122 is also located closely adjacent to engine core assembly 26, the link also is capable of expanding and contracting with the jet engine.

Referring specifically to FIGS. 5, 8 and 9, lower auxiliary links 130 interconnect a central portion of thrust yoke 108' with a central section of engine core assembly 26 thereby reinforcing the thrust yoke sufficiently to accommodate the increased loads, primarily bending loads, imposed thereon by fan casing link 122. As shown in the figures, the upper ends of auxiliary links 130 are pivotally interconnected with side brackets 132 extending laterally outwardly from each side of thrust yoke 108' at a location generally below bracket 128. A crosspin 134 extends through aligned holes formed in the two ears of bracket 132 and through a corresponding opening formed in the upper end of auxiliary links 130. From brackets 132, auxiliary links 130 extend laterally downwardly and outwardly to pivotally interconnect with an annular flange 136 extending around the circumference of the adjacent portion of engine core assembly 26. The lower ends of auxiliary links 130 are secured to flange 136 by pins 138 that extend outwardly from the flange, or by other appropriate connectors.

It will be appreciated that loads imposed on thrust yoke 108' by fan casing link 122 will tend to cause bending of the thrust yoke. However, by utilizing auxiliary links 130, the thrust yoke is sufficiently reinforced to enable it to safely carry the additional loads imposed thereon by fan casing link 122.

In lieu of or in addition to lower auxiliary links 130, an upper auxiliary link 140, shown in phantom line in FIGS. 5, 9 and 10, may be employed to reinforce thrust yoke 108'. As shown in the figures, auxiliary link 140 extends upwardly from bracket 128 to pivotally interconnect with a bracket 142 extending forwardly from edge portion 144 of wing strut 24. The upper end of link 140 is pinned to bracket 142 by a crosspin 146 extending through aligned holes formed in the spaced apart ear portions of the bracket and through a corresponding hole formed in the auxiliary link. Ideally, the lower end portion of auxiliary link 140 is connected to crosspin 129 with a clevis 146 or similar member to avoid imposing any torque loads on thrust yoke 108' acting about an axis extending longitudinally of the thrust yoke.

It will be appreciated that upper auxiliary link 140 functions in substantially the same manner as lower auxiliary links 130, i.e., to carry a portion of the loads imposed on thrust yoke 108' by fan casing link 122. Ideally, the lower auxiliary links 130 and upper auxiliary link 140 are constructed from hollow, tubular, high strength material to minimize the weight of the links while enabling them to safely carry high level loads.

FIGS. 11-16 illustrate a further preferred embodiment of the present invention for securing a turbo fan jet propulsion engine to an aircraft. In FIGS. 11-16, the components of wing 22, engine 20 and the securing system that are identical or substantially identical to corresponding components in FIGS. 1-10 are referred to by the same reference numerals as used in these prior figures. The description and function of these conmponents have been described above and thus will not be entirely repeated here. Instead, the following description will focus on the differences between the securing system shown in FIGS. 11-16 from those shown in FIGS. 1-10.

The embodiment of the present invention illustrated in FIGS. 11-16, ideally includes a rear hanger assembly 80" that is substantially identical to corresponding hanger assemblies 80 and 80' shown in FIGS. 1-10. The subject embodiment, however, includes a forward hanger assembly 50", that is somewhat different in construction than forward hanger assemblies 50 and 50' shown in FIGS. 1-10, and described above. Forward hanger assembly 50" includes a generally vertical hanger member 52" depending downwardly from lugs 54" to pivotally interconnect with a bracket 150 secured to the upper portions of radial flanges 60 of fan casing 32. A crosspin 56" extends transversely through aligned openings formed in lugs 54" and in the upper end portion of vertical hanger member 52". Also, a crosspin 62" extends transversely through aligned openings formed in the upwardly extending, parallel, spaced apart mounting ears of bracket 150 and through a corresponding cross hole formed in the lower portion of hanger member 52".

Figure 16:
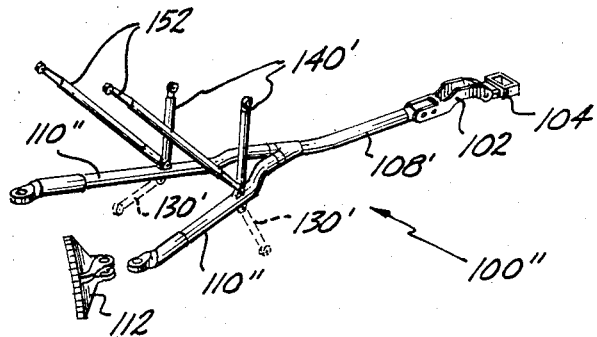

As most clearly illustrated in FIGS. 11 and 16, a pair of fan casing truss links 152 interconnect the upper portions of fan casing 32 with the forked portions 110" of thrust yoke member 108". The forward end portions of links 152 are pivotally interconnected with the ear portions of brackets 154 mounted between flanges 60 at the upper porton of fan casing 32 at locations circumferentially spaced from mounting bracket 150. A crosspin 156 extends through aligned openings and brackets 154 and through a corresponding cross hole formed in the upper end portion of links 152. From brackets 154, links 152 extend diagonally downwardly and rearwardly to pitotally interconnect with brackets 158 extending upwardly from forks 110″ of thrust yoke 108″. Brackets 158 are constructed with a pair of upwardly extending ears to receive the lower ends of links 152 therebetween and with crosspins 160 extending through aligned openings formed in brackets 158 and through a corresponding cross hole formed in the lower ends of the fan casing struts. Alternatively, bracket 158 can be constructed in the form of a single upwardly extending lug member, not shown, to engage between the two ear portions of a clevis, not shown, secured to the lower end of links 152.

It will be appreciated that all of the above discussed forward hanger members 52, 52′ and 52″; rear hanger members 82, 82′ and 82″; fan casing links, 66, 122 and 152; upper and lower auxiliary links 130 and 140; and, thrust yokes 108, 108′ and 108″ can be constructed with end portions in the form of clevis-type members, not shown, to engage with corresponding brackets or lugs. Also, ideally each of these members is in the form of hollow tubular material to minimize their weight while enabling them to carry safely a maximum load.

Referring specifically to FIGS. 11, 15 and 16, the present invention also includes lower auxiliary links 130′ for interconnecting intermediate portions of thrust yoke 108″ with a central section of engine core assembly 26 thereby reinforcing the thrust yoke sufficiently to enable it to accommodate the increased loads imposed thereon by fan casing truss links 152. As shown in the figures, the upper ends of lower auxiliary links 130′ are pivotally connected with side brackets 161 extending laterally outwardly and downwardly from each thrust yoke fork 110′ at a location generally below a corresponding bracket 158. A crosspin 162 extends through aligned holes formed in bracket 160 and through a corresponding hole formed in the upper end portion of the auxiliary links 130′. From side brackets 160, auxiliary links 130′ extend laterally downwardly and outwardly to pivotally interconnect with brackets 164 secured to an intermediate portion of engine core assembly 26.

In lieu of, or in addition to, lower auxiliary links 130′, upper auxiliary links 140′, shown in phantom lines in FIGS. 11, 15 and 16, extend upwardly from brackets 158 to pivotally interconnect with brackets 142′ extending forwardly from edge 144 of wing strut 24. The upper end of each link 140′ is pinned to bracket 142′ by a crosspin 146′ extending through aligned holes formed in the spaced apart ear portions of the bracket and through a corresponding hole formed in the auxiliary links. Ideally, the lower end portion of auxiliary links 140′ are connected to brackets 158 with a clevis 146′ or similar member to avoid imposing any torque loads on thrust yoke member 108″ acting about an axis extending longitudinally of the thrust yoke.

It will be appreciated that upper auxiliary links 140′ function in substantially the same manner as lower auxiliary links 130′, i.e., to carry a portion of the loads imposed on thrust yoke member 108″ by fan casing links 152′. Ideally, the lower and upper auxiliary links 130′ and 140′ are constructed from hollow, tubular, high strength material to minimize the weight of the links while enabling them to carry safely high level loads.

It will be appreciated that fan casing truss links 152 perform the same function as corresponding fan casing links 122 and 66, described above, i.e., to restrain fan casing 32 from axial movement relative to engine core assembly 26. The links 152 may be advantageously employed in situations in which the singular link 122, FIGS. 5-10 above, would interfere with components of jet engine 20. In addition, it will be appreciated that links 152 are capable of accommodating longitudinal growth of jet engine 20 due to the thermal expansion of the engine. This is possible since the rearward ends of links 152 are secured to yoke 108″ which, as discussed above, expands and contracts with the extension and contraction of the jet engine.

As will be apparent to those skilled in the art to which the invention is addressed, the present invention may be embodied in forms other than those specifically disclosed above without departing from the spirit or essential characteristics of the invention. The particular embodiments of the systems for suspending a jet engine 20 from an aircraft wing 22, described above, are therefore to be considered in all respects as illustrative and not restrictive. The scope of the present invention is as set forth in the appended claims, rather than being limited to the examples of the securing systems set forth in the foregoing description.

The embodiments of the invention in which an exclusive property or privilege is claimed are defined as follows:

1. A system for securing a jet propulsion engine to an aircraft, the engine having a core assembly, a fan powered by the core assembly and a fan casing enclosing the engine fan, said securing system comprising:
    first means extending between the fan casing and the aircraft for securing the fan casing against lateral and vertical movement relative to the aircraft;
    second means for securing the fan casing against pitch movement relative to the aircraft during normal operation of the aircraft, said second securing means comprising substantially rigid fan casing link means oriented generally longitudinally relative to the engine to transmit forces imposed on the fan casing along a vector component extending longitudinally relative to the engine, said fan casing link means connected at one end to the aircraft at a location longitudinally spaced from the location of the connection between the first securing means and the aircraft and connected at the opposite end closely adjacent the location of the connection between the first securing means and the fan casing; and,
    third means for securing the engine core assembly to the aircraft to retain the engine against lateral, vertical and torsional movement relative to the aircraft, said third securing means includes an elongate thrust yoke disposed generally longitudinally relative to the engine axis of rotation, said thrust yoke having a forward end portion secured to a forward portion of the engine core assembly at locations relative to the diametrical center of the engine axis of rotation toward the circumferential location at which said fan casing link means is connected to the fan casing.

2. The system according to claim 1, wherein said fan casing link means extends from the fan casing directly to the aircraft structure.

3. The system according to claim 2, wherein:
said first securing means comprises a hanger member having an upper portion pivotally connected to the aircraft and a lower portion pivotally connected to the fan casing; and,
said fan casing link means are pivotally connected to the aircraft and to the fan casing.

4. The system according to claim 1, wherein said fan casing link means extend from the fan casing to said third securing means.

5. A system for securing a jet propulsion engine to an aircraft, the engine having a core assembly, a fan powered by the core assembly and a fan casing enclosing the engine fan, said securing system comprising:
first means for securing the fan casing against lateral and vertical movement relative to the aircraft;
second means for securing the fan casing against pitch movement relative to the aircraft, said second securing means comprising fan casing link means oriented to transmit forces imposed on the fan casing along a vector component extending longitudinally relative to the engine;
third means for securing the engine core assembly to the aircraft to retain the engine against lateral, vertical and torsional movement relative to the aircraft;
wherein said fan casing link means extend from the fan casing to said third securing means;
wherein said third securing means includes an elongate thrust yoke disposed generally longitudinally relative to the engine axis of rotation, said thrust yoke having a forward end portion secured to a forward portion of the engine core assembly and a distal rearward end portion interconnected to the aircraft at a location spaced rearwardly of the forward end portion of said thrust yoke; and,
wherein said fan casing link means include a forward portion secured to the fan casing and a rearward portion secured to an intermediate portion of said thrust yoke.

6. The system according to claim 5, wherein:
said first securing means comprises a hanger member having an upper portion connected to the aircraft and a lower portion connected to the fan casing; and,
the forward portion of said fan casing link means is secured to the fan casing at a location adjacent the location that the lower portion of said hanger member is connected to the fan casing.

7. The system according to claim 6, further comprising first auxiliary link means having a first end portion interconnected with an intermediate portion of said thrust yoke and a second end portion interconnected to the aircraft.

8. The system according to claim 6, further comprising second auxiliary link means having a first end portion interconnected to an intermediate portion of said thrust yoke and a second portion interconnected to the engine core assembly.

9. The system according to claim 5, further comprising first auxiliary link means having a first end portion interconnected to an intermediate portion of said thrust yoke and a second end portion interconnected to the aircraft.

10. The system according to claim 5, further comprising second auxiliary link means having first end portions interconnected with an intermediate portion of said thrust yoke and second end portions interconnected to the engine core assembly.

* * * * *